UNITED STATES PATENT OFFICE.

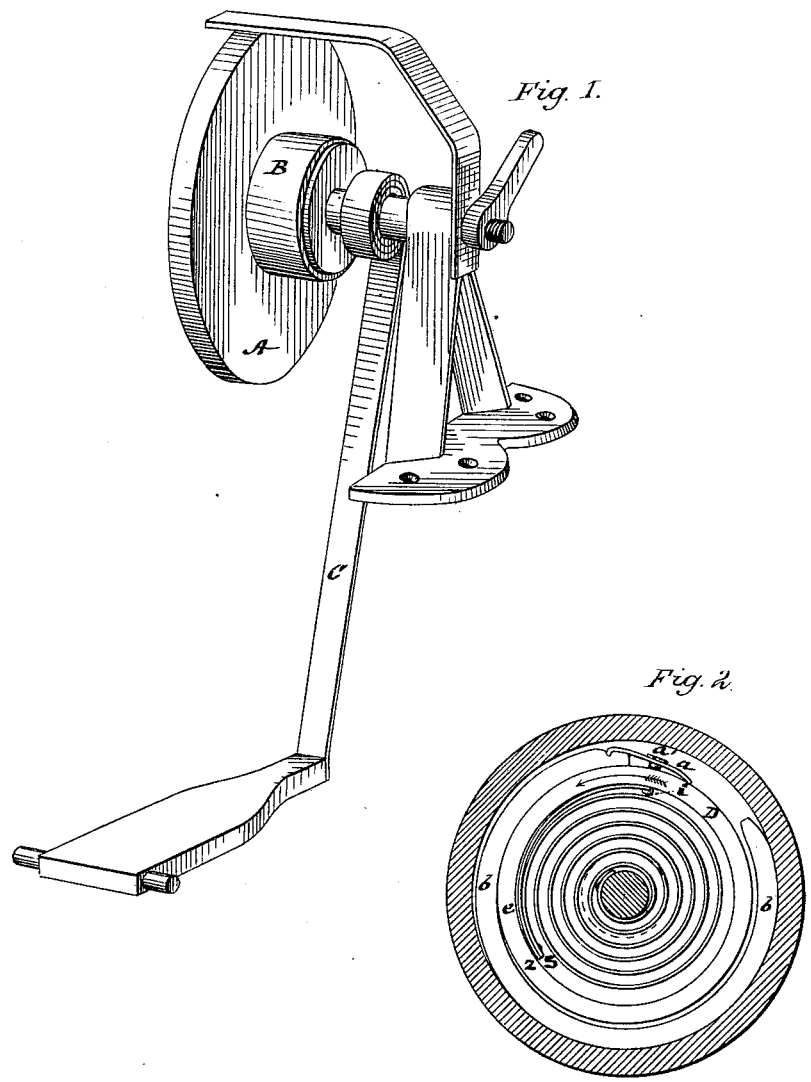

CHARLES H. ROBINSON, OF ST. PAUL, MINNESOTA.

IMPROVEMENT IN FRICTION-CLUTCHES.

Specification forming part of Letters Patent No. 197,177, dated November 13, 1877; application filed May 7, 1877.

*To all whom it may concern:*

Be it known that I, CHARLES H. ROBINSON, of St. Paul, Minnesota, have invented certain new and useful Improvements in Friction-Clutches, of which the following is a clear, full, and exact description, reference being had to the accompanying drawings, making a part of this specification, in which—

Figure 1 is a perspective view of a machine with my improved clutch attached. Fig. 2 is a side elevation of the clutch-box with the outer casing removed.

My invention relates to that class of friction-clutches used in driving any kind of revolving bodies; and it consists, essentially, in a clutch, of rubber or other like material, which will contract upon itself, and will allow the revolving body to travel ahead of the driving mechanism.

To enable others skilled in the art to make and use my invention, I will proceed to describe the exact manner in which I have carried it out.

In the drawings, A represents a grindstone driven by a friction-clutch within the shell or case B, and, by means of the strap C, attached to any form of treadle. Within the shell B is the strap $b$, constructed entirely of rubber, and secured to the spool D by the metal clasp $a$ and screw $a'$. This strap lies in the space between the spool and the outer shell or hub, presses against the hub without the aid of cams or wedges, and crowds against the friction-surface in a radial direction through its quality of contracting upon itself, thus securing efficient and certain action in the clutch, which is simple, cheap, and not liable to get out of order.

I am aware that it is not new to use metal clutches covered with leather or rubber; but such I do not claim as my invention, nor can such clutches contract upon themselves and crowd against the friction-surface like my improved rubber clutch.

Within the spool D I secure the clock-spring S, to take up the reciprocating motion. This spring is secured at its outer end to the spool by means of a piece of the spring $e$, doubled back on itself at $z$, and brought in contact with the stop $i$ formed by the inner end of the screw $a'$, thus avoiding the strain which tends to pull the spring loose from the spool.

Having thus explained my invention, what I claim to be new, and desire to secure by Letters Patent, is—

1. A friction-clutch for propelling revolving bodies, consisting of a strap, of rubber or other similar elastic or contractible material, inclosed within a case, substantially as and for the purpose set forth.

2. A rubber strap, in combination with the clasp $a$ and screw $a'$ and spool, substantially as and for the purpose set forth.

3. The spring S, bent at $z$, forming piece $e$ and stop $i$, constructed and arranged to operate substantially as and for the purpose set forth.

CHAS. H. ROBINSON.

Witnesses:
 FRANK W. HAWKS,
 HOWARD POTTS.